(12) United States Patent
Lin et al.

(10) Patent No.: US 7,296,598 B2
(45) Date of Patent: Nov. 20, 2007

(54) VACUUM CANISTER

(75) Inventors: Yvonne S. Lin, New York, NY (US); Steven M. Dibdin, Brooklyn, NY (US); Antonio Carlo Hernandez Celestin, Brooklyn, NY (US); Clay A. Burns, New York, NY (US)

(73) Assignee: Wilton Industries, Inc., Woodridge, IL (US)

( * ) Notice: Subject to any disclaimer, the term of this patent is extended or adjusted under 35 U.S.C. 154(b) by 576 days.

(21) Appl. No.: 10/833,537

(22) Filed: Apr. 28, 2004

(65) Prior Publication Data

US 2005/0244293 A1 Nov. 3, 2005

(51) Int. Cl.
*B65B 31/04* (2006.01)

(52) U.S. Cl. ........................ 141/65; 141/302; 141/326; 220/240; 215/270

(58) Field of Classification Search ............... 141/4, 141/7, 8, 65, 192, 301, 302, 325, 326; 220/212, 220/240, 203.23, 231; 215/228, 262, 270; 206/524.8; 99/472
See application file for complete search history.

(56) References Cited

U.S. PATENT DOCUMENTS

| | | |
|---|---|---|
| 1,946,872 A | 2/1934 | Muhleisen |
| 2,114,105 A | 4/1938 | Gerber |
| 2,117,368 A | 5/1938 | Sellers |
| 2,297,378 A | 9/1942 | Wittenberg |
| 2,457,867 A | 1/1949 | Chambers |
| 2,502,776 A | 4/1950 | Burdick |
| 2,669,176 A | 2/1954 | Lazerus |
| 2,890,810 A | 6/1959 | Rohling |
| 3,313,444 A | 4/1967 | Katell |
| 4,149,650 A | 4/1979 | Whelchel et al. |
| 4,278,114 A | 7/1981 | Ruberg |
| 4,362,095 A | 12/1982 | Wheatley |
| 4,372,096 A | 2/1983 | Baum |
| 4,889,250 A | 12/1989 | Beyer |
| 4,909,014 A | 3/1990 | Kobayashi et al. |
| 5,347,918 A | 9/1994 | Chen |
| 5,390,809 A * | 2/1995 | Lin ............................ 220/212 |
| 5,398,811 A * | 3/1995 | Latella, Jr. ............... 206/524.8 |
| 5,449,079 A | 9/1995 | Yang |
| 5,513,480 A | 5/1996 | Tsoi |
| 5,558,243 A | 9/1996 | Chu |
| 5,564,480 A * | 10/1996 | Chen ........................... 141/65 |
| 5,564,581 A | 10/1996 | Lin |
| 5,651,470 A | 7/1997 | Wu |

(Continued)

Primary Examiner—Timothy L. Maust
(74) Attorney, Agent, or Firm—DLA Piper US LLP; R. Blake Johnston, Esq.

(57) ABSTRACT

A vacuum canister includes a storage space and a removable lid. The lid includes a pump housing that defines a pumping chamber within which a sliding piston is disposed. The piston is connected to a handle via a piston rod and features a skirt-like piston valve that seals against the side wall of the pump housing when the piston travels downward but permits air to pass when the piston travels upward. Air is pumped from the canister storage space via the pump. A vacuum indicator and release valve are also positioned in the lid. A bellows communicates with the canister storage space and contracts when a vacuum is present. The bellows is connected to a lever which pivots to extend a button indicating the presence of the vacuum. Pushing the button causes the lever to engage a vacuum release valve.

9 Claims, 5 Drawing Sheets

U.S. PATENT DOCUMENTS

| | | |
|---|---|---|
| 5,653,191 A | 8/1997 | Calhoun et al. |
| 5,692,632 A | 12/1997 | Hsieh et al. |
| 5,735,317 A | 4/1998 | Wu |
| 5,803,282 A | 9/1998 | Chen et al. |
| 5,992,666 A | 11/1999 | Wu |
| 6,044,756 A | 4/2000 | Chang |
| 6,375,024 B1 | 4/2002 | Park |
| 6,644,489 B2 * | 11/2003 | Chang .................. 220/203.01 |
| 2003/0047531 A1 | 3/2003 | Wong |
| 2003/0056711 A1 | 3/2003 | Tranter |

* cited by examiner

VACUUM CANISTER

BACKGROUND OF THE INVENTION

The present invention generally relates to containers for storing food items and other perishables and, more specifically, to an improved vacuum canister.

Food, beverages and other perishable items are typically stored in containers such as bottles or canisters. The perishable items stored in such containers, however, deteriorate over time due to air that remains in the container after the container is covered for storage with a lid or cover. The air often contains moisture which further deteriorates the canister contents. Such deterioration may also diminish the natural aroma of the perishable item. In order to prevent such spoilage, it is known to provide vacuum canisters that feature pumps for removing most of the air from the interior of the canister after it is sealed.

In addition to removing air from the interior of the canister, the vacuum assists in maintaining the seal between the canister and the canister lid. As a result, prior art vacuum canisters also typically include a release valve so that the vacuum in the canister may be released prior to removal of the canister lid. In addition to featuring a pump and a vacuum release valve, a number of prior art vacuum canisters feature a vacuum indicator so that the user knows when air has been evacuated from the canister.

An example of a prior art vacuum canister is presented in U.S. Pat. No. 5,692,632 to Hsieh et al. The container of the Hsieh et al. '632 patent includes a lid with a built-in pump. More specifically the lid features a button in its top that, when depressed, forces a piston downwards in a pumping chamber. The piston is connected to the button by a piston rod containing a conduit that leads from the pumping chamber to the exterior of the container. As a result, when the button is pressed down, air below the piston travels out of the pumping chamber through the piston rod conduit to the exterior of the container.

In addition, as the piston of the Hsieh et al. '632 patent moves downward, air from the interior of the container enters the portion of the pumping chamber above the piston through a one-way valve. When the button is released, the piston travels upward due to the force exerted by a compression spring. As the piston travels upward, the air above the piston travels through holes in the periphery of the piston, past an O-ring, to the portion of the pumping chamber below the piston. The downward pumping stroke of the button may then be repeated. The O-ring seals the holes in the periphery of the piston, and also seals the gap between the periphery of the piston and the pumping chamber wall, during the downward pumping stroke so that air may only escape the portion of the pumping chamber below the piston through the piston rod conduit.

While the pumping system of the Hsieh et al. '632 patent works well, the creation of the multiple holes in the periphery of the piston increases manufacturing complexity and costs as does the O-ring seal and the piston rod conduit. In addition, the holes may become clogged or otherwise obstructed which would adversely effect pumping performance. A further disadvantage of the container of the Hsieh et al. '632 patent is that it does not feature a vacuum indicator.

As mentioned previously, a number of prior art vacuum containers provide vacuum indicators. An example of such a container is presented in U.S. Pat. No. 5,803,282 to Chen et al. In addition to including a vacuum pump, the lid features a bellows with an open bottom end that is in communication with the interior of the container. A compression spring is positioned within the bellows and urges the upper end of the bellows upwards out of an aperture formed in the top surface of the lid. As a result, when air has not been evacuated from the container, the upper end of the bellows protrudes up from the top surface of the lid. When air has been evacuated from the container, however, the resulting vacuum pulls the upper end of the bellows down into the aperture so that the presence of the vacuum is indicated to a user.

The container of the Chen et al. '282 patent also includes a vacuum release valve for releasing the vacuum in the container so that the container lid may be easily removed. The valve includes knob which, when pressed downwards, unseats an O-ring so that the interior of the container is permitted to communicate with the surrounding atmosphere through an aperture.

While both the vacuum indicator and release valve of the container of the Chen et al. '282 patent work well, it would be advantageous to combine their functions into a single device. Such an approach would streamline the appearance of the container. In addition, operation of the device would be simplified and more intuitive as users may often instinctively press in on the vacuum indicator of the Chen et al. '282 patent expecting to release the vacuum instead of searching for a separate release valve.

Accordingly, it is an object of the present invention to provide an improved vacuum canister that features a pumping mechanism that is durable and easy to operate.

It is another object of the present invention to provide an improved vacuum canister with a vacuum indicator that indicates when air has been evacuated from the canister.

It is another object of the present invention to provide an improved vacuum canister with a vacuum indicator that also functions as a vacuum release valve.

It is still another object of the present invention to provide an improved vacuum canister that is simple and economical to manufacture.

These and other objects and advantages will be apparent from the following specification.

SUMMARY OF THE INVENTION

The present invention is directed to a vacuum canister for storing perishable items. The canister includes a body having an open top and defining a storage space with a lid removably covering the open top of the body. A pump housing is positioned within the lid and defines a pumping chamber that selectively communicates with the atmosphere and the storage space via exhaust and intake passages, respectively, that are formed in the lid. A piston is slidably positioned within the pumping chamber and has a pump handle attached thereto via a piston rod. A compression spring is positioned between the pump housing and the bottom of the piston and urges the piston upward.

A skirt-like piston valve is positioned around the periphery of the piston and seals against the pump housing when the piston is moved downward. Air is permitted to pass between the periphery of the piston and the pump housing when the piston is moved upward. As a result, air is transferred from the storage space to the pumping chamber via the intake passage while air is simultaneously expelled from the pumping chamber to the atmosphere via the exhaust passage as the piston travels downward. A filter and an intake check valve are positioned within the intake passage.

The canister also features a vacuum indicator and release valve that includes a bellows positioned within the lid with an open bottom in communication with the storage space so that the bellows contracts when air is evacuated from the storage space. A compression spring is positioned within the bellows and urges it into the expanded configuration. A button is also positioned in the lid and is slidable between an extended position and a retracted position. A venting passage is formed in the lid between the storage space and the atmosphere with a vacuum release valve positioned therein. A lever is pivotally mounted within the lid and includes a first end attached to the top of the bellows and a second end engaging the release valve and the button so that when the bellows contracts, the lever places the button in the extended position and the vacuum release valve seals the venting passage. Pressing the button when in the extended position opens the vacuum release valve so that the vacuum in the storage space is released through the venting passage.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
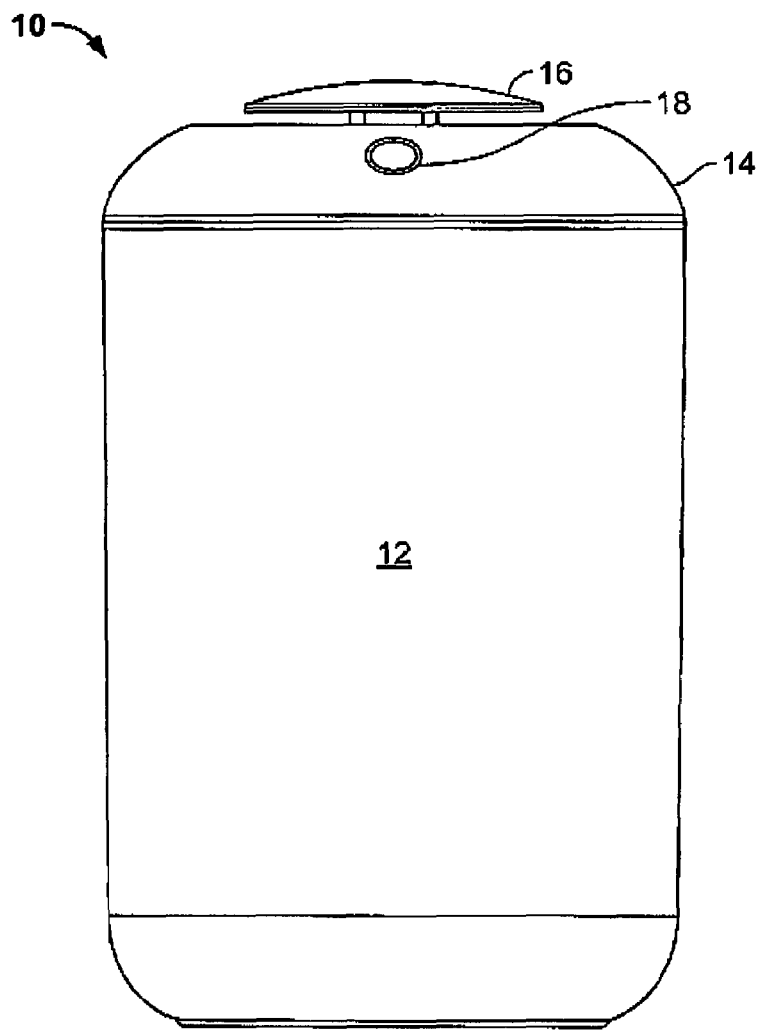
FIG. 1 is a front elevation view of an embodiment of the vacuum canister of the present invention.
Figure 2:
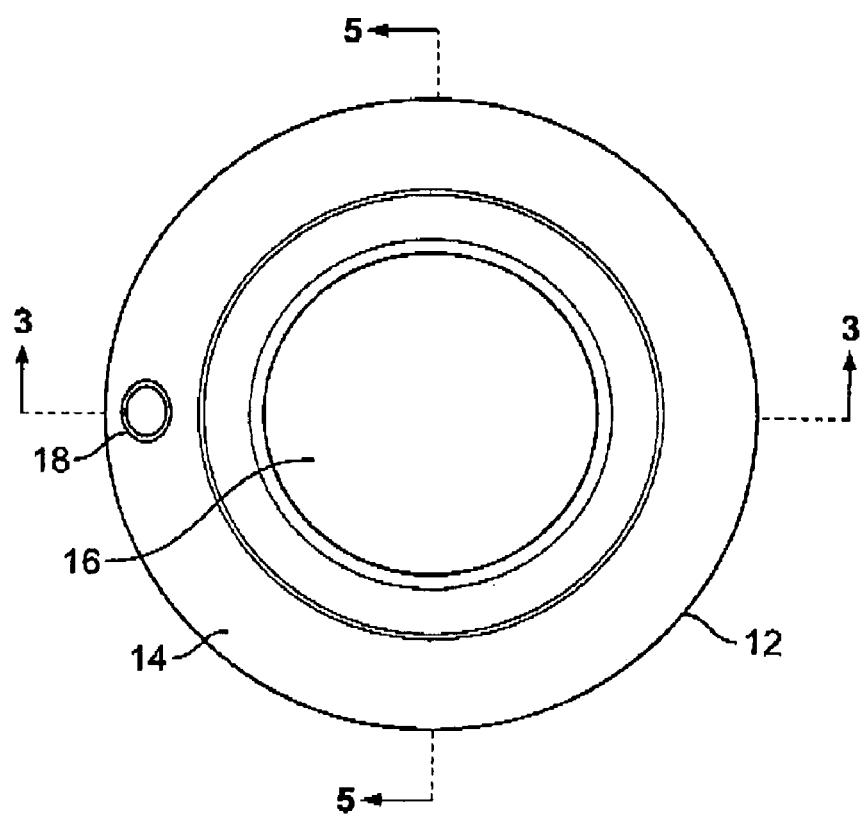
FIG. 2 is a top plan view of the vacuum canister of FIG. 1.

An embodiment of the improved vacuum canister of the present invention is indicated in general at 10 in FIGS. 1 and 2. The canister features a body 12 that is open at the top and which receives a lid 14. As will be explained in greater detail below, the lid is equipped with a pump that is operated by pressing and releasing pump handle 16 in a repetitive fashion. The lid also features a button 18 that, as will also be explained in greater detail below, indicates when air has been evacuated from the canister via the pump. The button may also be pressed to release the vacuum within the canister so that lid 14 may be easily removed from the canister body 12.

Figure 3:
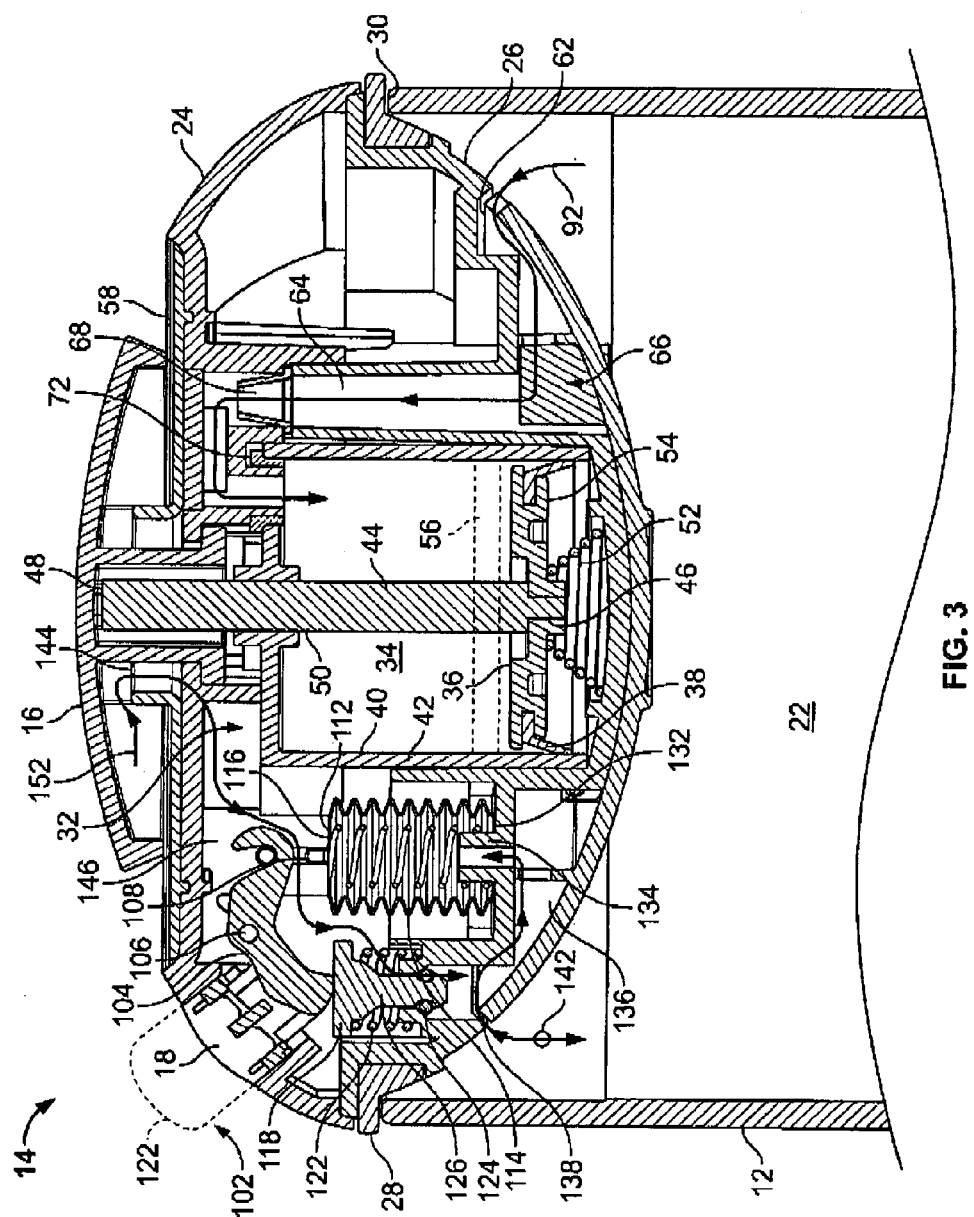
FIG. 3 is a sectional view of the vacuum canister of FIG. 2 taken along line 3-3.

As illustrated in FIG. 3, canister body 12 encloses and defines a storage space 22 within which food, beverages or other perishable items may be stored. The canister lid, indicated in general at 14, features a top shell 24 and a bottom shell 26 that are joined. The canister lid also features a circumferential gasket 28, constructed of plastic, rubber or an alternative sealing material, that engages the open top edges 30 of the canister body 12 in a removable fashion.

Figure 4:
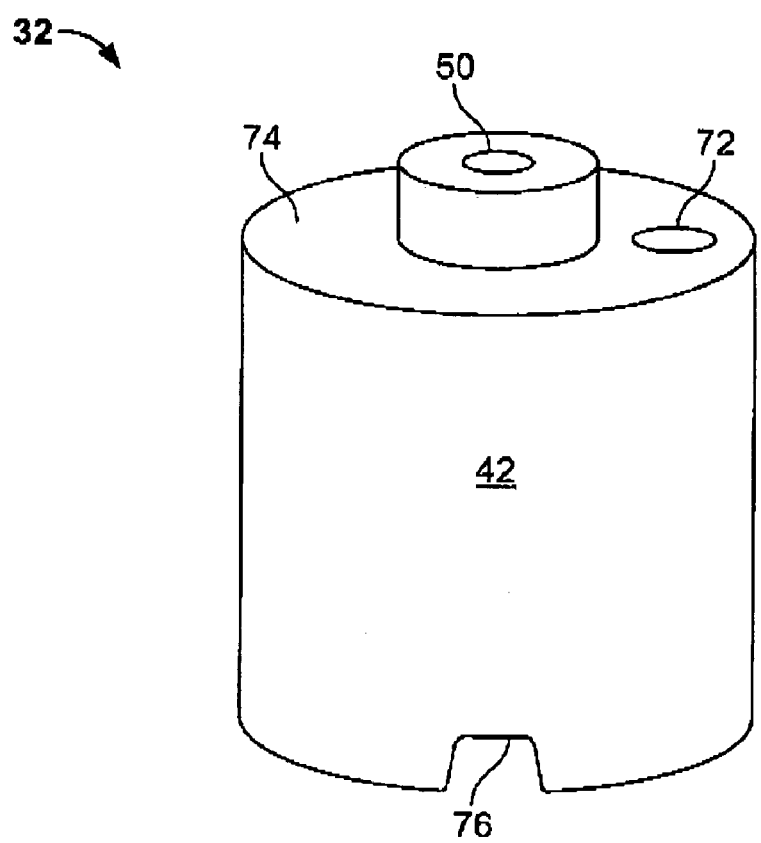
FIG. 4 is a perspective view of the pump housing of the vacuum canister of FIGS. 1-3.

Positioned between the top and bottom shells of the lid 14 is a pump housing, indicated in general at 32 in FIGS. 3 and 4. Pump housing 32 defines a pumping chamber 34. A piston 36 is slidably positioned within the chamber 34. A piston rod 44 is connected to the piston by its lower end 46 and to pump handle 16 by its upper end 48. The piston rod passes out through the top of pump housing 32 via opening 50 (see also FIG. 4).

A skirt-like piston valve 38 formed of rubber, flexible plastic or the like is positioned around the periphery of the piston 36 and engages the inner surface 40 cylindrical side wall 42 of the pump housing. More specifically, the skirt-like configuration of the piston valve 38 causes it to seal against the inner surface 40 of side wall 42 when the piston 36 is traveling downward, however, air may pass between the piston valve 38 and the inner surface 40 of the side wall when piston 36 is traveling upward.

A compression spring 52 positioned between the bottom shell 26 of the lid and the bottom 54 of the piston urges piston 36 upward towards the position indicated in phantom at 56. As a result, when handle 16 is pressed, piston 36 travels down from its initial resting position 56 to the position illustrated in FIG. 3. When handle 16 is released, spring 52 moves piston 36 from the position illustrated in FIG. 3 back up to its initial resting position 56. A recess 58 is formed in the top portion of upper shell 24 to accommodate handle 16 when it is pressed in. While FIGS. 3 and 5 illustrate the preferred position for compression spring 52, it could be placed in a variety of alternative positions, such as between the handle 16 and the top panel 74 (FIG. 4) of the pump housing or the top shell 24.

As illustrated in FIG. 3, an opening 62 is formed in the bottom shell 26 of the lid. The opening 62 leads to an intake passage 64 within which filter 66 is positioned. An intake check valve 68 is also positioned within the passage 64 and permits air to enter the pumping chamber 34 through an opening 72 formed in the top panel 74 of the pump housing 32 (see also FIG. 4).

Figure 5:
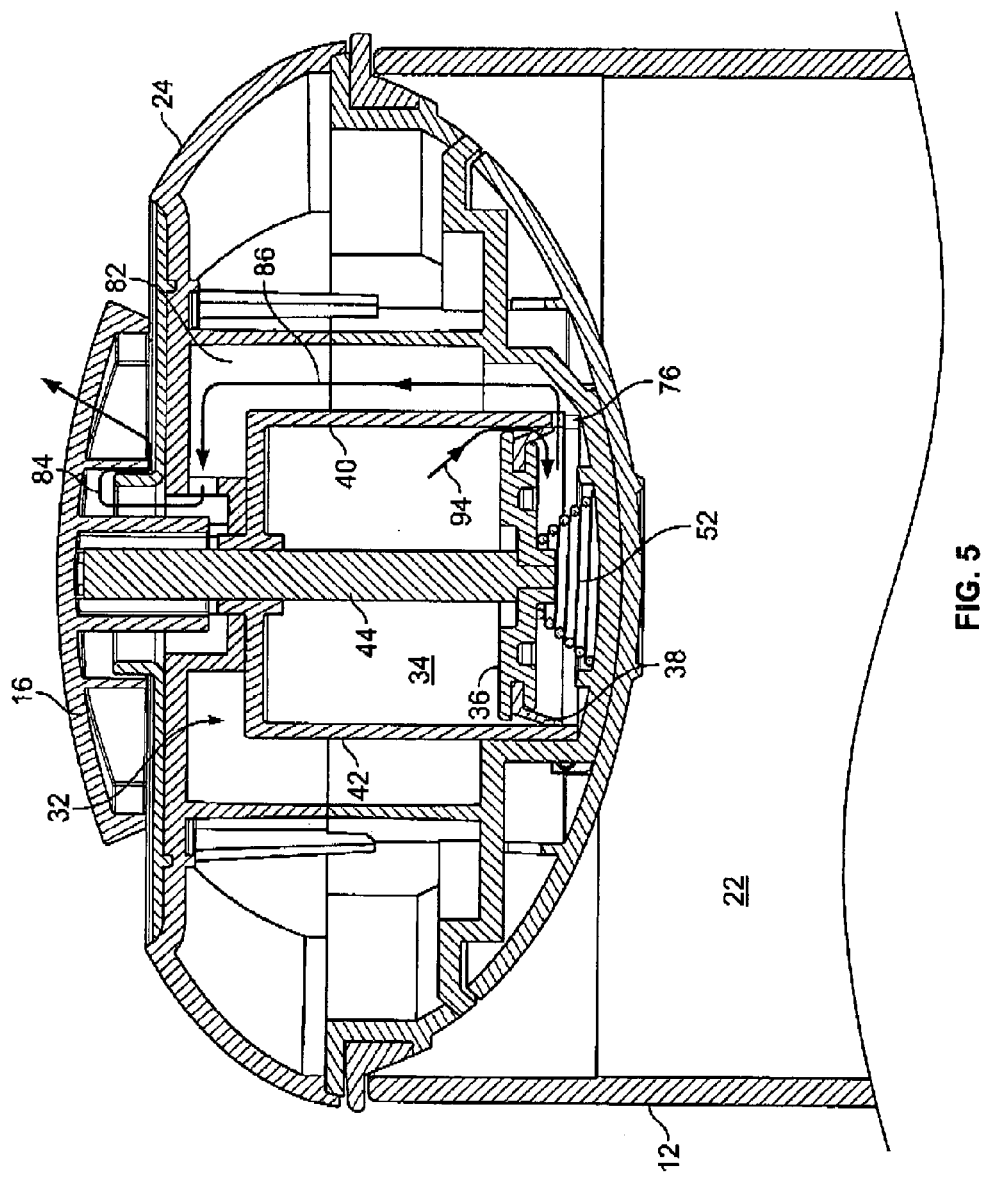
FIG. 5 is a sectional view of the vacuum canister of FIG. 2 taken along line 5-5.

As illustrated at 76 in FIGS. 4 and 5, an aperture 76 is formed in the bottom of the pump housing 32. As illustrated in FIG. 5, the aperture leads from the pumping chamber 34 to an exhaust passage 82 which opens to the atmosphere via a gap 84 between the handle 16 and the top shell 24.

With reference to FIG. 5, in operation, piston 36 travels down through pumping chamber 34 as pump handle 16 is pressed down. The sealing between the piston valve 38 and the pump housing wall 42 causes air in the portion of the pumping chamber beneath the piston to be expelled through aperture 76, through passage 82 and out to the atmosphere through gap 84, as illustrated by arrow 86 in FIG. 5.

The downward travel of piston also causes suction to occur above the piston so that air is withdrawn from the interior storage space 22 of the canister along the path illustrated by arrow 92 in FIG. 3. More specifically, the air travels from the storage space 22 through opening 62 and is filtered through filter 66 as it travels through passage 64. The air then continues through intake check valve 68 and into the portion of the pumping chamber 34 above the piston 36.

As described previously, when pump handle 16 is released, piston 36 travels upward to the position illustrated in phantom at 56 in FIG. 3. As a result, as illustrated by arrow 94 in FIG. 5, air in the portion of the pumping chamber above the piston is forced between the piston valve 38 and interior surface 40 of pump housing wall 42 to the portion of the pumping chamber below the piston by the action of check valve 68 (FIG. 3) and the upward travel of the piston. The pump handle 16 is then pressed down again to exhaust the air beneath the piston from the canister.

As a result, repetitive pressing and releasing of the pump handle removes air from the storage space 22 of the canister so that a vacuum is formed. This causes the contents of the canister to remain fresher for an extended period of time and also strengthens the seal between the lid 14 and the canister body.

A vacuum indicator and release valve assembly, indicated in general at 102 in FIG. 3, is provided to indicate when air has been evacuated from the canister and to permit the vacuum to be released when it is desired to remove the lid 14 from the canister. The assembly includes a lever 104 that is pivotally mounted in the lid 14 via pin 106. One end of the lever includes a hook 108 to which the top end 112 of a bellows 114 is connected. A compression spring 116 is positioned within the bellows and urges the bellows into the expanded configuration illustrated in FIG. 3.

The end of the lever 104 opposite hook 108 engages button 18 and a valve member 118. Button 18 is slidable between the retracted position illustrated in FIG. 3 and an extended position indicated in phantom at 122. A valve compression spring 122 surrounds valve member 118 and urges it upward. The lower end of valve member 118 is provided with an O-ring 124 which engages and seals an opening 126 due to the action of spring 122.

The bottom end 132 of the bellows 114 is open and is fitted over a conduit 134 which communicates with the storage space 22 within the canister via a passage 136 and an opening 138 formed in the bottom shell 26. As a result, when air is evacuated from canister storage space 22, it is also withdrawn, as indicated by arrow 142, from the interior of bellows 114 through conduit 134, passage 136 and opening 138. This causes the bellows to contract against the action of spring 116. As a result, the top end 112 of the bellows is lowered so that the lever 104 pivots clockwise.

As lever 104 travels clockwise, the end opposite of the hook end 108 forces button 18 to slide outwards into the position indicated in phantom 122 in FIG. 3, thus indicating the presence of a vacuum in the canister. In addition, when the lever 104 has pivoted in the clockwise direction due to a vacuum in the canister storage space 22, valve member seals opening 126 via O-ring 124 and the action of compression spring 122.

When it is desired to release the vacuum in the canister so that the lid 14 may be removed, button 18 is pressed so that it is returned to the position illustrated in FIG. 3. As the button slides inward, it causes lever 104 to pivot counter-clockwise so that valve member 118 is forced downward by the end of lever 104. This causes the O-ring 124 to become unseated from opening 126. As a result, air from the atmosphere travels into the canister storage area 22 through gap 144, venting passage 146 and opening 126, as indicated by arrow 152. In addition to releasing the vacuum within the canister storage space 22, this permits spring 116 to urge the bellows 114 back into the extended configuration illustrated in FIG. 3 so that lever 104 is maintained in the position illustrated in FIG. 3 which retains the button 18 in the retracted position indicating the absence of a vacuum within the canister.

While the preferred embodiments of the invention have been shown and described, it will be apparent to those skilled in the art that changes and modifications may be made therein without departing from the spirit of the invention, the scope of which is defined by the appended claims.

What is claimed is:

1. A vacuum canister for storing perishable items comprising:
    a) a body having an open top and defining a storage space;
    b) a lid removably covering the open top of the body;
    c) a pump housing positioned within said lid and defining a pumping chamber that selectively communicates with the atmosphere and the storage space;
    d) a piston slidably positioned within the pumping chamber;
    e) a pump handle;
    f) a piston rod connecting the pump handle to the piston so that said piston may be actuated via the pump handle; and
    g) a skirt-like piston valve formed of flexible material and extending downwardly and generally radially-outward from a periphery of the piston and sealing against the pump housing so that air is expelled from the pumping chamber to the atmosphere when the piston is moved in a first direction, said skirt valve also permitting air to pass between the periphery of the piston and the pump housing so that air is transferred from the storage space to the pumping chamber when the piston is moved in a second direction.

2. The vacuum canister of claim 1 wherein the pump housing communicates with the storage space via an intake passage and the atmosphere via an exhaust passage.

3. The vacuum canister of claim 2 wherein a filter is positioned within the intake passage.

4. The vacuum canister of claim 2 wherein a check valve is positioned within the intake passage.

5. The vacuum canister of claim 2 wherein the exhaust passage communicates with the atmosphere via a gap between the pump handle and the lid.

6. The vacuum canister of claim 1 further comprising a compression spring positioned between the piston and the pump housing.

7. The vacuum canister of claim 1 wherein the lid includes a top shell and a bottom shell with the pump housing positioned there between.

8. The vacuum canister of claim 1 wherein the first direction of the piston is downwards.

9. The vacuum canister of claim 1 further comprising a gasket between the lid and the body.

* * * * *